July 19, 1938.   C. W. LAMB   2,124,199
AMUSEMENT DEVICE
Filed Dec. 23, 1935   2 Sheets-Sheet 1
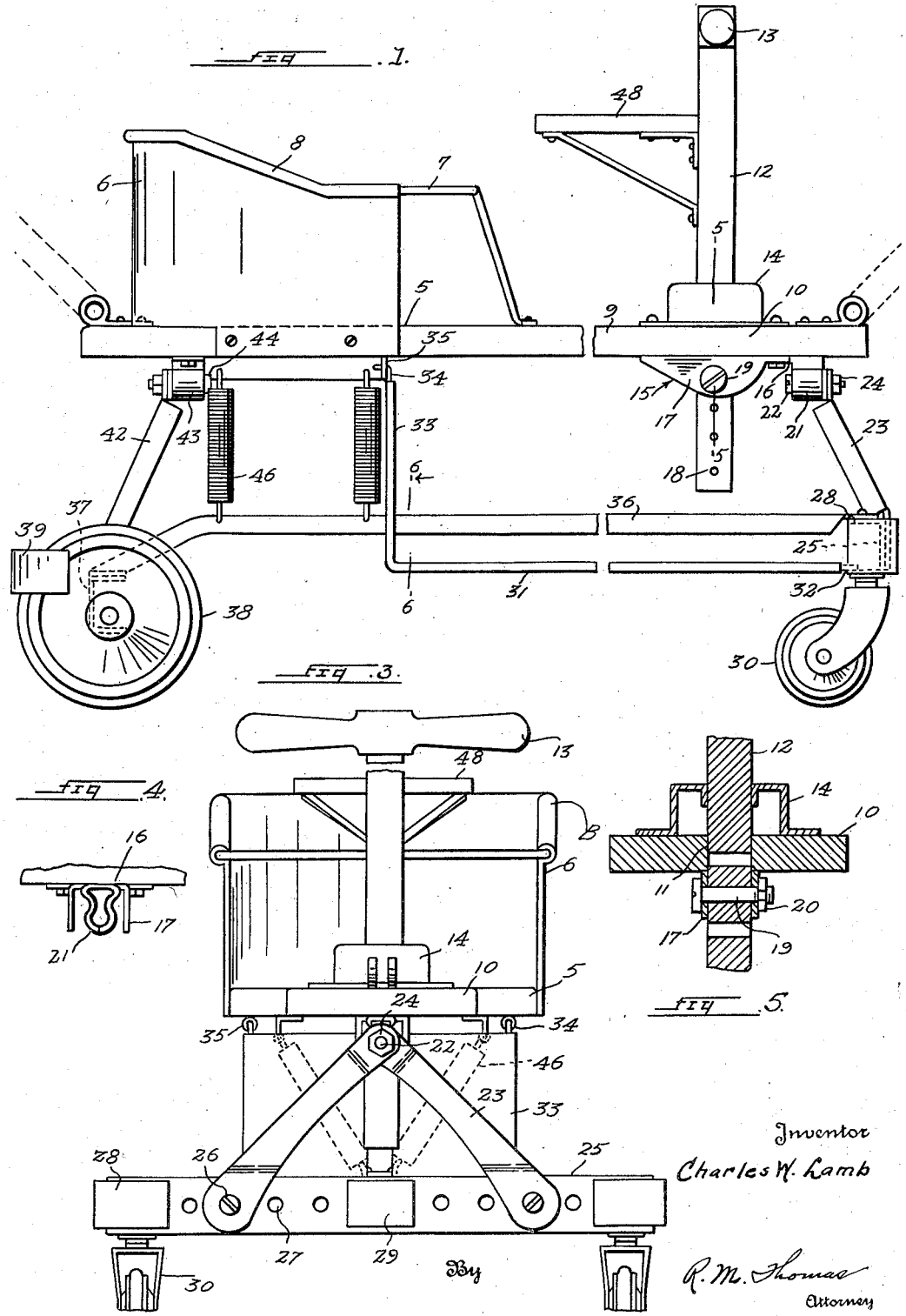

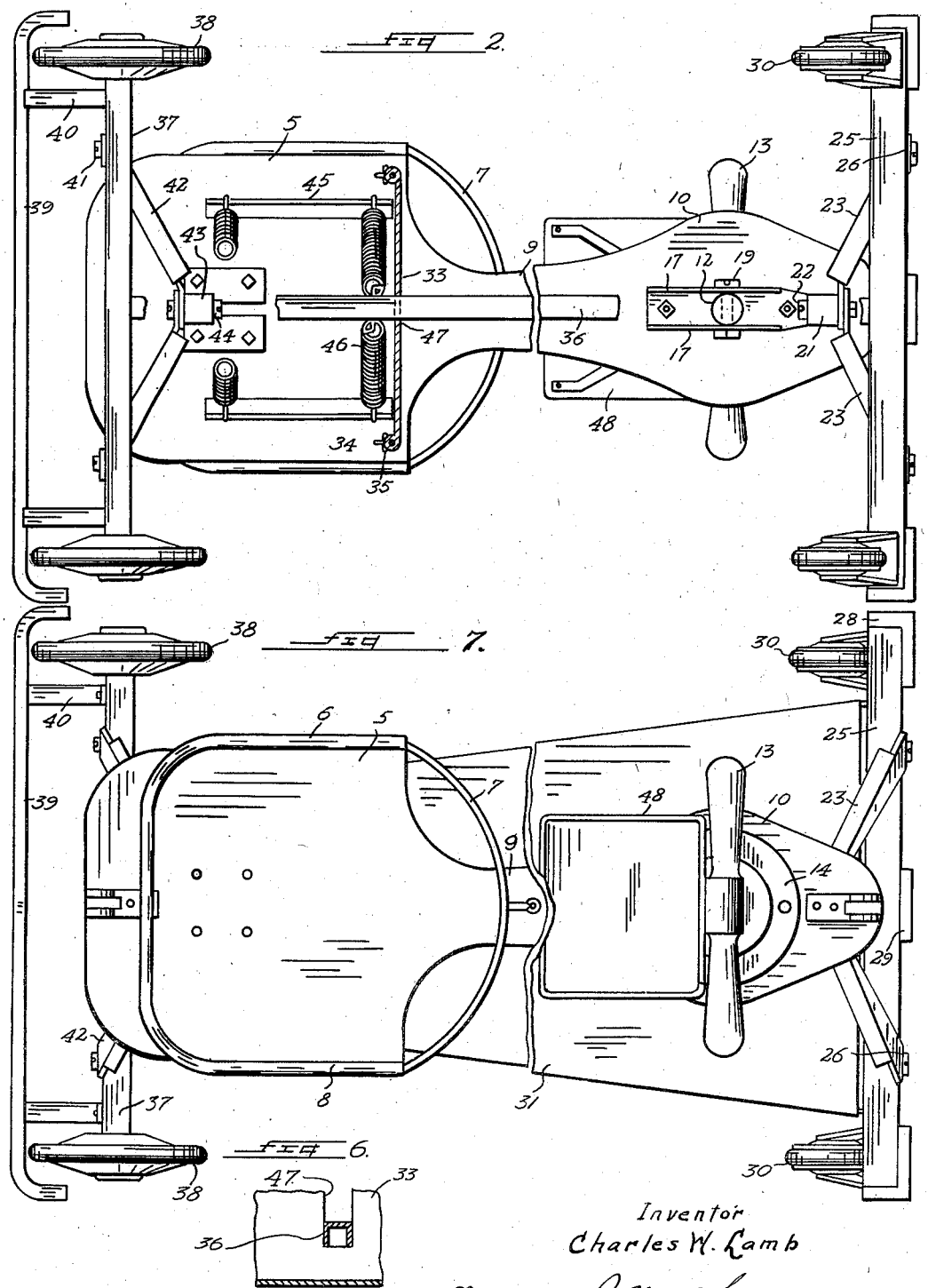

Patented July 19, 1938

2,124,199

UNITED STATES PATENT OFFICE 2,124,199

AMUSEMENT DEVICE

Charles W. Lamb, Buffalo, N. Y.

Application December 23, 1935, Serial No. 55,786

3 Claims. (Cl. 155—22)

My invention relates to new and useful improvements in amusement devices in the form of a child's toy of the wheeled type.

A further object of the invention is to provide a wheeled toy for children which, because of its unique construction, will not be liable to tip over very easily.

A still further object of the present invention is to provide a child's wheeled toy which also incorporates a tray from which the child can eat or on which he can play with small toys.

These objects I accomplish with the device illustrated in the accompanying drawings in which similar numerals and letters of reference indicate like parts throughout the several views and as described in the specification forming a part of this application and pointed out in the appended claims.

In the drawings:

Figure 1 is a side elevation of the toy.

Figure 2 is an inverted plan view of the toy with certain parts broken away.

Figure 3 is a front elevation of the toy.

Figure 4 is a front elevational view of the forward brackets.

Figure 5 is a fragmentary detailed sectional view taken substantially on line 5—5 of Figure 1.

Figure 6 is a fragmentary detailed sectional view taken substantially on line 6—6 of Figure 1.

Figure 7 is a plan view of the toy with certain parts cut away.

In the drawings, the seat of the toy is shown as 5, having an upstanding side wall 6 around the rear portion thereof. This side wall 6 is preferably of sheet metal and has its upper edge portion rolled over a semi-circular guard rail 7 as at 8, this guard rail 7 extending around in front of the seat as shown in Figure 2, and is supported by a downwardly extended bracket to brace it from the seat.

The seat 5 has a narrow neck extension 9 connecting to the forward head portion 10 which has a vertically extending opening 11 therein through which the post 12 extends. The upper end of this post is provided with laterally disposed handle bars 13 while the collar 14 on the head 10 has an opening centrally therethrough, through which the post 12 snugly fits. This collar 14 assists in supporting the post.

Secured to the under side of the head 10 is a bracket 15 which consists of a plate 16 provided at its rear end portion with a pair of wing members 17—17 (see Figs. 4 and 5) extending against opposite sides of the post 12. The wing members 17—17 are provided with aligned openings and the post 12 is provided with longitudinally spaced openings 18, and when one of the openings 18 is aligned with the openings in the wing members 17 a bolt 19 may be passed through the same and retained by a nut 20, thus maintaining the post 12 in the desired vertically adjusted position.

The forward portion of this plate 16 is stamped to provide a depending loop bracket 21 through which a bolt 22 extends, this bolt extending also through the upper ends of two brace members 23—23 and is equipped with a nut 24 to hold the braces in fixed relation thereto.

A front wheel supporting channel cross bar 25, has its outer end portions secured to the brace members 23—23 at their lower ends by bolts 26 and obviously the head 10 can be adjusted vertically from this cross bar 25 by moving the lower ends of the braces 23—23 inwardly or outwardly and disposing the bolts 26 through openings 27. The front side of this channel bar 25 is provided with bumper blocks 28 and caster type wheels 30 are provided at each end of the bar 25.

As will be observed in Figure 1, a foot supporting platform 31 is provided, the same having hook members 32 at its forward end for engagement through openings in the lower flange of the channeled bar 25, while the upstanding back wall 33 thereof is provided with hook members 34 for engagement through the eyes 35 on the bottom of the seat 5.

A reinforced bar 36 extends from the top of the channel bar 25 at the intermediate portion thereof, to connect to the top and intermediate portion of the rear cross channel bar 37. This bar 37 is clearly shown in Figure 2, and is equipped at each end with a wheel 38. A bumper 39 is secured to the cross bar 37 by arms 40.

The cross bar 37 is also provided with longitudinally spaced openings through which the bolts 41 extend to connect the rear braces 42 to the said cross bar 37.

A barrel 43 is secured to the bottom of the seat 5 and has a bolt 44 extending therethrough for connecting the upper ends of the braces 42 to the bottom of the seat 5.

Two angle irons 45 are disposed longitudinally and secured to the bottom of the seat 5, and coiled springs 46 are connected with these angle irons 45 at their upper ends and extend downwardly to connect to the portion of the reinforcing bar 36 underlying the seat 5. The back wall 33 of the foot support platform is notched as at 47 to accommodate the reinforcing bar 36 as is clearly shown in Figure 6.

It can be seen that with the springs thus connecting the seat to the reinforcing bar 36, the seat will be tensionally supported in such a manner as to substantially eliminate any tendency of the device to tip over.

Furthermore, it will be observed that the device is constructed in such a manner as to accommodate children of any age.

It will be obvious that modifications in size and shape and materials may be made in this invention without departing from the spirit of the invention or the scope of the claims.

Having thus described my invention I desire to secure by Letters Patent and claim:

1. A wheeled toy of the character described comprising a seat board; a handle post vertically adjustable through the seat board; a depending foot-supporting platform supported by the board; brackets mounted medially on the underside of each end of said seat board; front and rear wheeled units for the said board; means rockably connecting said brackets to said wheeled units and spring sustaining means for the said seat to restrain tipping thereof.

2. A wheeled toy of the character described comprising a seat board; a handle post vertically adjustable through the seat board; a depending foot-supporting platform supported by the board; and front and rear wheeled units for the said board; a bar extending between the said wheeled units; means rockably supporting the board on the units; and spring sustaining members between the said bar and the seat board.

3. In a wheeled toy of the class described, the combination of a seat board; spaced apart front and rear wheeled units for said board; centrally situated brackets mounted at the front and rear of said board on the under side thereof; means to pivotally mount said brackets to inwardly slanting brace members extending upwardly from said units; a reinforced bar extending from front wheeled unit to rear wheeled unit; spaced apart channels mounted longitudinally of the broader rear portion of said seat board; coil springs connected with said channels and converging toward each other to be connected to said reinforced bar; a depending foot-supporting platform supported by said seat board and the front wheeled unit; means whereby the board may be adjusted vertically with respect to the wheeled units; and a handle post vertically mounted through said seat board said post being passed down through said seat board only and not connected with either of said wheeled units.

CHARLES W. LAMB.